(12) United States Patent
Mima et al.

(10) Patent No.: US 8,671,529 B2
(45) Date of Patent: Mar. 18, 2014

(54) CLOSED-END TREATMENT STRUCTURE OF SLIDE FASTENER FOR VEHICLE SEAT

(75) Inventors: Kazuaki Mima, Tochigi (JP); Tsutomu Matsuzaki, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 222 days.

(21) Appl. No.: 13/070,808

(22) Filed: Mar. 24, 2011

(65) Prior Publication Data

US 2011/0232048 A1 Sep. 29, 2011

(30) Foreign Application Priority Data

Mar. 26, 2010 (JP) ................. 2010-072181

(51) Int. Cl.
*A44B 19/08* (2006.01)
*A44B 19/26* (2006.01)

(52) U.S. Cl.
USPC ....................... 24/432; 297/228.13

(58) Field of Classification Search
USPC ........... 24/401, 387, 388, 389, 396, 436, 433, 24/432, 435, 405; 2/85, 93, 96; 297/228.13
See application file for complete search history.

(56) References Cited

U.S. PATENT DOCUMENTS

| 1,933,372 | A | * | 10/1933 | Fisher | 297/218.1 |
|---|---|---|---|---|---|
| 2,218,089 | A | * | 10/1940 | Marinsky | 24/432 |
| 2,648,113 | A | * | 8/1953 | Rissman | 24/433 |
| 2,866,245 | A | * | 12/1958 | Elgin | 24/426 |
| 2,923,009 | A | * | 2/1960 | Cookman | 2/227 |
| 5,181,299 | A | * | 1/1993 | Huang | 24/432 |
| 6,079,779 | A | | 6/2000 | Tanaka et al. | |
| 8,061,780 | B2 | * | 11/2011 | Tsuji et al. | 297/452.58 |
| 8,127,370 | B2 | * | 3/2012 | Nunn | 2/69 |

FOREIGN PATENT DOCUMENTS

JP 11-169263 A 6/1999

* cited by examiner

*Primary Examiner* — Robert J Sandy
*Assistant Examiner* — Rowland D Do
(74) *Attorney, Agent, or Firm* — Carrier Blackman & Associates, P.C.; Joseph P. Carrier; Anne G. Sabourin

(57) ABSTRACT

A closed-end treatment structure for a slide fastener of a vehicle seat, the structure including: a pair of cloth tapes to be attached to a seat skin of the vehicle seat; a pair of teeth lines respectively attached to the pair of cloth tapes; a slider configured to move from a top stop side to a bottom stop side while detachably meshing the teeth lines; a pull-tab connected to the slider through a connection portion; and a storing portion configured to store the slider, the pull-tab and end portions of the cloth tapes, in a state where the slider is moved to the bottom stop side, thereby storing the closed-end of the slide fastener.

5 Claims, 6 Drawing Sheets

CLOSED-END TREATMENT STRUCTURE OF SLIDE FASTENER FOR VEHICLE SEAT

CROSS-REFERENCE TO RELATED APPLICATION (S)

This application claims priority from Japanese Patent Application No. 2010-072181 filed on Mar. 26, 2010, the entire contents of which are incorporated herein by reference.

FIELD

Embodiments described herein relate to a closed-end treatment structure of a slide fastener attached to a seat skin of a vehicle seat.

BACKGROUND

Generally, a vehicle seat includes a seat cushion (seat bottom) and a seat back. For example, the seat back is covered with a seat skin which includes a back piece and side pieces. A slide fastener is attached to each of boundary portions between the back piece and the side pieces. When assembling the seat back, the seat skin is disposed over a back pad of the seat back while the slide fasteners are opened, and then, the slide fasteners are closed.

In this case, a closed-end of the slide fastener will extend downward the seat back. It is preferable to store the extended closed-end within the seat back.

JP-H11-169263-A proposes a structure in which a closed-end of a slide fastener which is extended downward a seat back is folded back so as to be stored within a gap between the seat skin and the back pad.

When the closed-end of the slide fastener is folded back inside the seat skin, the thickness of the seat skin is increased by the thickness of the folded-back closed-end due to the superposition thereof. Further, the workability for storing is not good.

Further, since the folded-back portion of the slide fastener becomes wasteful, weight of the seat itself and assembling costs are increased. Still further, since a pull-tab of the slide fastener is left free in an unfixed manner to move, abnormal noise may be generated due to vibration or external impact caused in association with starting the engine or driving the vehicle on roads.

SUMMARY

One object of the present invention is to provide a closed-end treatment structure of a slide fastener in a vehicle seat capable of storing a closed-end of the slide fastener with good appearance through a simple configuration and shortening a total length of the slide fastener, to thereby suppress the weight of the seat itself and assembling costs and prevent the generation of abnormal noise by a pull-tab.

According to a first aspect of the present invention, there is provided a closed-end treatment structure for a slide fastener of a vehicle seat, the structure including: a pair of cloth tapes to be attached to a seat skin of the vehicle seat; a pair of teeth lines respectively attached to the pair of cloth tapes; a slider configured to move from a top stop side to a bottom stop side while detachably meshing the teeth lines; a pull-tab connected to the slider through a connection portion; and a storing portion configured to store the slider, the pull-tab and end portions of the cloth tapes, in a state where the slider is moved to the bottom stop side, thereby storing the closed-end of the slide fastener.

According to a second aspect of the present invention, there may be provided the structure, wherein the storing portion has a depth of about Y, where a substantially total length of the slider and the pull-tab is Y in a state where the pull-tab is turned over toward the meshed teeth lines.

According to a third aspect of the present invention, there may be provided the structure, wherein the storing portion is formed from a rectangular cloth material having a lateral width of about 2X, where a lateral width of the closed-end of the slide fastener is X, wherein the cloth material is folded to sandwich one of the cloth tapes and sewn thereto, thereby forming the storing portion which encloses the one of the cloth tapes, and wherein the storing portion stores the other of the cloth tapes through an opening.

According to a fourth aspect of the present invention, there may be provided the structure, wherein the storing portion is formed from a rectangular cloth material having a lateral width of about 2X, where a lateral width of the closed-end of the slide fastener is X, wherein the cloth material is folded to sandwich one of the cloth tapes and sewn thereto, thereby forming the storing portion which orients outward the one of the cloth tapes, and wherein the storing portion stores the other of the cloth tapes by being turned inside out.

According to a fifth aspect of the present invention, there may be provided the structure, wherein the storing portion is formed from a cloth material having a rectangular portion and a sewing belt portion which continues from substantially a center of an upper edge of the rectangular portion, wherein the rectangular portion has a lateral width of about 2X, where a lateral width of the closed-end of the slide fastener is X, wherein side edges the cloth material which is being folded are sewn together except an upper edge and a folded edge to have a bag shape, wherein the sewing belt portion is sewn to one of the cloth tapes above the closed-end of the slide fastener, and wherein the storing portion stores both of the cloth tapes inside the bag shape.

According to the first aspect of the present invention, by sewing the storing portion for storing the slider, the end portions of both the cloth tapes and the pull-tab to one of the cloth tapes around the closed-end of the slide fastener, the closed-end of the slide fastener can be stored with good appearance through the simple configuration, and a total length of the slide fastener can be shortened so as to suppress the weight of the seat itself and assembling costs. In addition, since the pull-tab is held within the storing portion, the pull-tab is prevented from moving to generate abnormal noise.

According to the second aspect of the present invention, by providing the storing portion having the depth capable of storing the pull-tab in a state where the pull-tab is turned from the connecting portion with the slider towards the teeth lines, while storing the slider, the end portions of both the cloth tapes and the pull-tab within the storing portion, the storing portion is prevented from largely swelling by the pull-tab.

According to the third aspect of the present invention, by providing the storing portion by folding the rectangular cloth material which has the lateral width which is approximately twice the lateral width of the closed-end of the slide fastener into two, inserting one cloth tape first between the folded cloth material to be superposed therewith, and sewing the superimposed three members together along the side edges of the cloth material with the folded edge of the cloth material oriented towards the other cloth tape into the cylindrical envelope shape, so that the other cloth tape to which the cloth material is not sewn is stored inside the cylindrical envelope, the closed-end of the slide fastener is stored with good appearance through the simple configuration.

According to the fourth aspect of the present invention, by providing the storing portion by folding the rectangular cloth material which has the lateral width which is approximately twice the lateral width, of the closed-end of the slide fastener into two, inserting one cloth tape first between the folded cloth material to be superposed therewith, sewing the superimposed three members together along the side edges of the cloth material with the folded edge of the cloth material oriented outward the one cloth tape into the cylindrical envelope shape, and further, turning the cylindrical-envelope-shaped cloth material inside out from the lower end thereof upwards, so that the other cloth tape to which the cloth material is not sewn is stored inside the cylindrical envelope, no seam of the cloth material is exposed to the outside, whereby the closed-end of the slide fastener is stored with good appearance.

According to the fifth aspect of the present invention, by providing the storing portion by folding the cloth material into two which includes the rectangular portion which has the lateral width which is approximately twice the lateral width of the closed-end of the slide fastener and the sewing belt portion which continues from substantially the center of the upper edge of the rectangular portion, sewing together the other two edges of the folded cloth material excluding the upper edge of the rectangular portion and the folded edge into the bag shape, and further, sewing the sewing belt portion to one cloth tape above the closed-end of the slide fastener, the closed-end of the slide fastener is stored inside the bag so as not to be exposed entirely to the outside.

DETAILED DESCRIPTION

Figure 1:
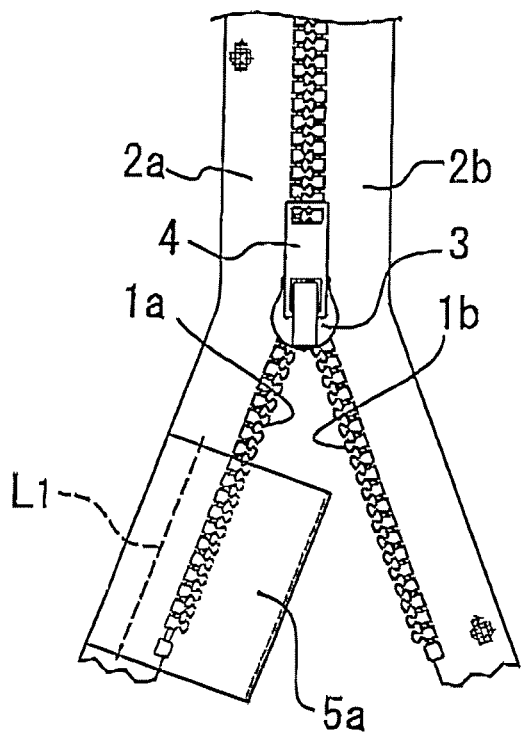
FIG. 1 illustrates a closed-end treatment structure for a slide fastener according to a first embodiment.

Generally, a vehicle seat includes a seat cushion (seat bottom) and a seat back, and the seat back is covered with a seat skin including a back piece and side pieces. Embodiments shown in the drawings are applied to a slide fastener which is attached to each of boundary portions between the back piece and the side pieces. The slide fastener is attached such that the seat skin is disposed over a back pad of the seat back while the slide fasteners are opened, and the slide fasteners are then closed to thereby fully cover the back pad.

An open fastener as shown in FIG. 1 is exemplified as the slide fastener in the embodiments. For example, the open fastener includes cloth tapes 2a, 2b, teeth lines 1a, 1b and a slider 3. The teeth lines 1a, 1b are provided along inner side edges of the cloth tapes 2a, 2b so as to detachably mesh with each other. The slider 3 is positioned at a top stop side in a state where the teeth lines 1a, 1b are detached from each other. By puling down the slider 3 to a bottom stop side with a pull-tag 4, the teeth lines 1a, 1b are caused to mesh with each other. That is, in this example, the teeth lines 1a, 1b are opened downward in the detached state.

In the slide fastener, outer side edges of the cloth tapes 2a, 2b (where the teeth lines 1a, 1b are not provided) are sewn to side edges of the back piece and the side piece, thereby vertically attaching the slide fastener to the seat skin. In the attached state, the top stop side is situated at an upper side of the seat back, while the bottom stop side is situated at a lower side of the seat back. The lower side of the seat back is initially opened, and finally sealed. Each of the cloth tapes 2a, 2b and a corresponding one of the teeth lines 1a, 1b may be correctively referred to as a "lane".

In the embodiments, a storing portion 5a (5b, 5c) is provided to either the cloth tape 2a or the cloth tape 2b around a closed-end of the slide fastener (hereinafter, it is assumed that the storing portion 5a is sewn to the cloth tape 2a). The storing portion 5a has an opening. The storing portion 5a is configured to store not only the slider 3, but also end portions of the cloth tapes 2a, 2b and the pull-tab 4 thereinside, through the opening. That is, the storing portion 5a stores the closed-end of the slide fastener.

Figure 3:
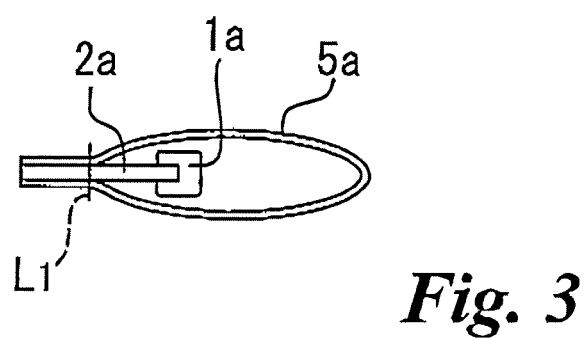
FIG. 3 illustrates a sewing state of the storing portion.
Figure 4:
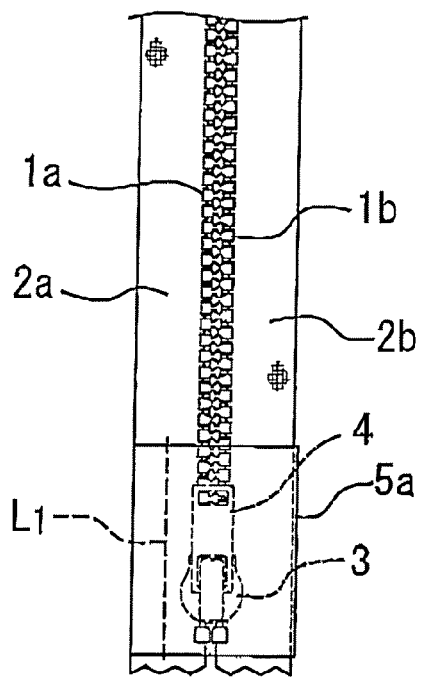
FIG. 4 illustrates a state where a closed-end of the slide fastener is stored in the storing portion of FIG. 1.
Figure 5A:
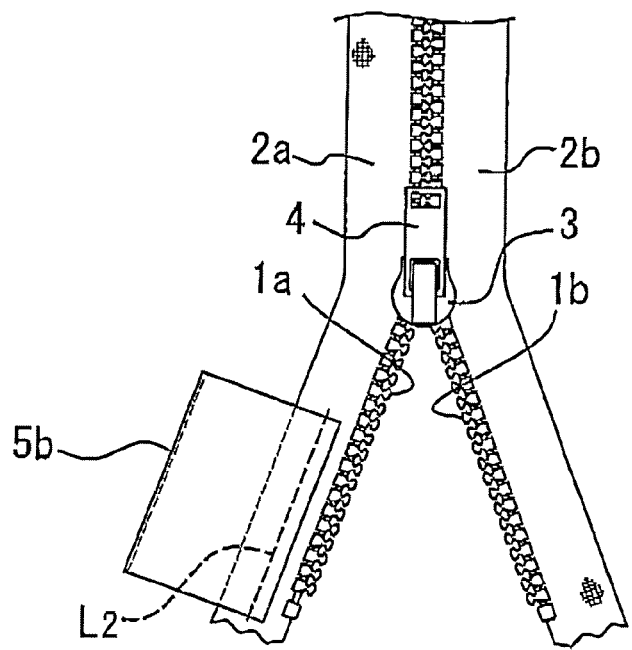
FIG. 5A illustrates a sewing state of a storing portion for storing a closed-end of a slide fastener according to a second embodiment.
Figure 5B:
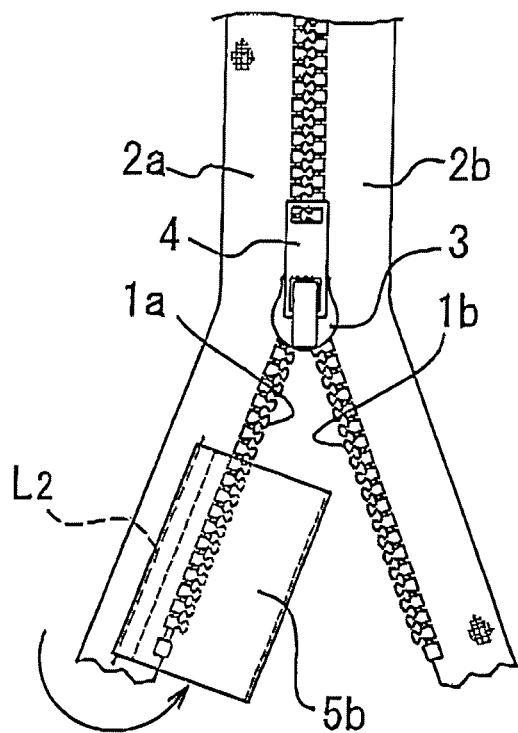
FIG. 5B illustrates a state where the storing portion of FIG. 5A is turned inside out.
Figure 6:
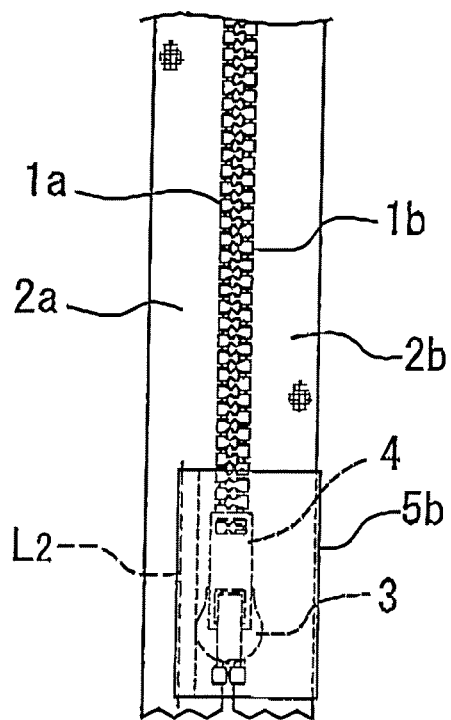
FIG. 6 illustrates a state where the closed-end of the slide fastener is stored in the storing portion of FIG. 5A.
Figure 7A:
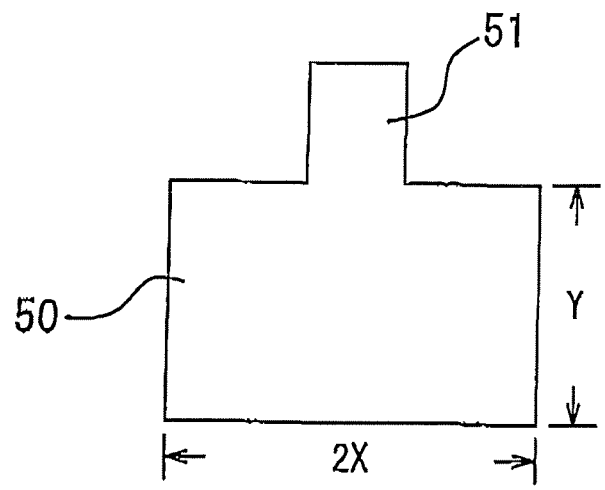
FIG. 7A illustrates a cloth material forming a storing portion for storing a closed-end of a slide fastener according to a third embodiment.
Figure 7B:
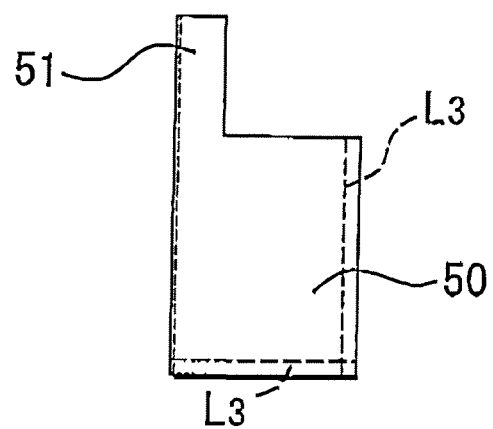
FIG. 7B illustrates a state where the cloth material of FIG. 7A is folded back.
Figure 7C:
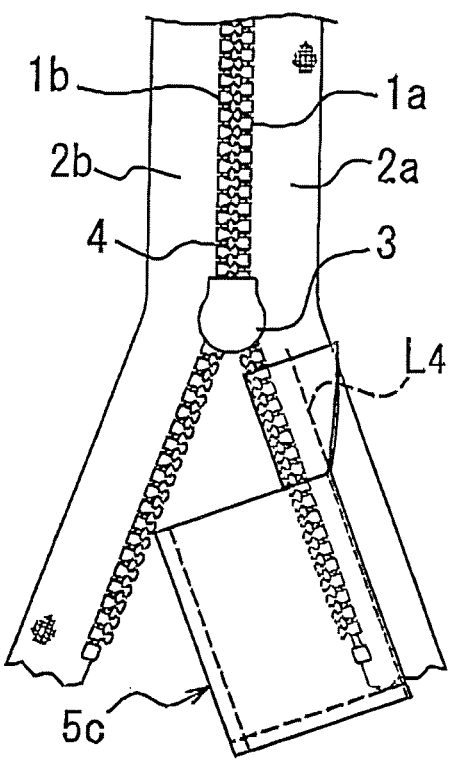
FIG. 7C illustrates a sewing state of the cloth material of FIG. 7B.
Figure 8:
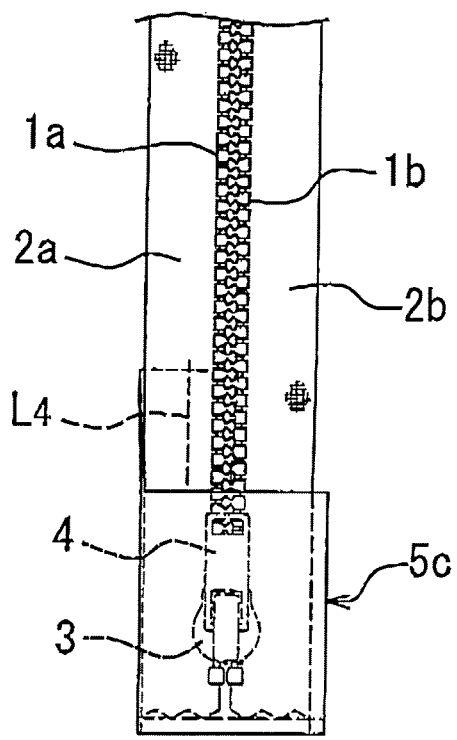
FIG. 8 illustrates a state where the closed-end of the slider fastener is stored in the storing portion of FIG. 7C.

Three embodiments having respective structures of storing portions 5a, 5b, 5c are exemplified: a first embodiment shown in FIGS. 1 to 4, a second embodiment shown in FIGS. 5A to 6; and a third embodiment shown in FIGS. 7A to 8.

Figure 2A:
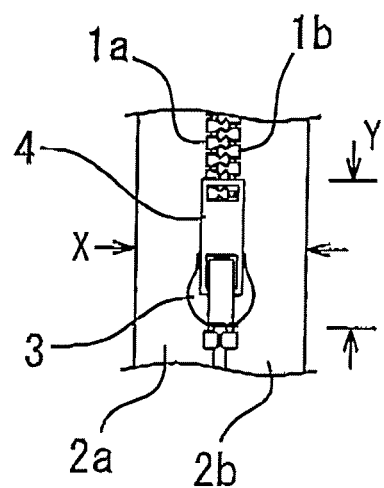
FIG. 2A illustrates a slide fastener on which a storing portion of FIG. 1 is provided.
Figure 2B:
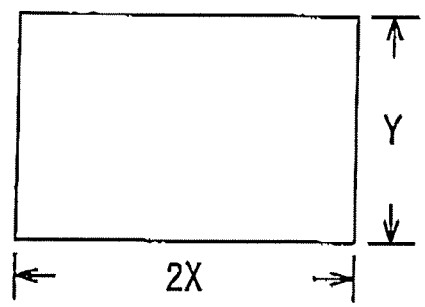
FIG. 2B illustrates a cloth material forming the storing portion.

In the first embodiment, as is shown in FIGS. 2a, 2b, a storing portion 5a is formed from a rectangular cloth material having a lateral width of about 2X and a vertical width of about Y. It is assumed that, in a state where both cloth tapes 2a, 2b are closed by meshing teeth lines 1a, 1b and where a pull-tab 4 connected to a slider 3 is turned over toward the teeth lines 1a, 1b side, a lateral width of a closed-end of a slide fastener is X, and a substantially total length of the slider 3 and the pull-tab 4 is Y.

The cloth material of FIG. 2B is folded into two to sandwich the cloth tape 2a and the teeth line 1a therebetween so that the three members are superposed, as shown in FIG. 3. Then, the three members are sewn along side edges of the cloth material as indicated by a stitch line L1, thereby forming the cylinder-like storing portion 5a. Thus, one lane (the teeth line 1a and the cloth tape 2a) to which the cloth material is stored inside the storing portion 5a.

Further, as shown in FIG. 4, the storing portion 5a can also store the other lane (the teeth line 1b and the cloth tape 2b) to which the cloth material is not sewn, through an opening of the storing portion 5a. Since the both lanes can be stored in this way, the closed-end of the slide fastener can be stored with good appearance through the simple configuration, and a total length of the slide fastener can be shortened, so as to suppress the weight of the seat itself and assembling costs. In addition, since the pull-tab 4 can be stored into the storing portion 5a in a fixed manner, the pull-tab 4 is prevented from moving, thereby preventing the generation of abnormal noise.

In the second embodiment, as with the first embodiment, a storing portion 5b is formed from a rectangular cloth material (refer to FIGS. 2A, 2B) having a lateral width of about 2X which is substantially twice a lateral width of a closed-end of a slide fastener and a vertical width of about Y which corresponds to a substantially total length of a slider 3 and a pull-tab 4 in a turned-over state.

The cloth material is folded into two to sandwich one cloth tape 2a therebetween so that the three members are superposed. Then, as shown in FIG. 5A, the three members are sewn along side edges of the cloth material as indicated by a stitch line L2, thereby forming a cylinder-like storing portion 5b to orient outward. Further, the storing portion 5b (the cloth material) is turned inside out from a state of FIG. 5A to a state of FIG. 5B. The storing portion 5b maintains the cylinder shape even when turned inside out.

In the second embodiment, as shown in FIG. 6, although a sewing margin for the cloth tape 2a is exposed from the storing portion 5b, the line stitch L2 in the cloth material can be enclosed within the storing portion 5b. As with the first embodiment, one lane (a teeth line 1a and the cloth tape 2) to which the cloth material is sewn can be stored inside the storing portion 5b by turning the storing portion 5b (the cloth material) inside out from the state of FIG. 5A to the state of FIG. 5B. Further, the other lane (a teeth line 1b and a cloth tape 2b) to which the cloth material is not sewn can also be stored inside the storing portion 5b. Thus, the closed-end of the slide fastener can be stored with good appearance.

In a third embodiment, as shown in FIG. 7A, a storing portion 5c is formed from a cloth material having a rectangular portion 50 and a sewing belt portion 51 which continues from substantially a center of an upper edge of the rectangular portion 50. The rectangular portion 50 has a lateral width of about 2X which is substantially twice a lateral width of a closed-end of a slide fastener and a vertical width of about Y which corresponds to a substantially total length of a slider 3 and a pull-tab 4 in a turned-over state.

As shown in FIG. 7B, first the cloth material is folded into two, and then, side edges of the cloth material are sewn together except an upper edge and a folded edge of the rectangular portion 50 as indicated by stitch lines L3, L3, thereby forming a bag. Then, as shown in FIG. 7C, the cloth material is sewn to a rear surface (from which the pull-tag 4 does not appear) of one cloth tape 2a, thereby forming the bag-shaped storing portion 5c. The sewing belt portion 51 is sewn to the cloth tape 2a as indicated by a stitch line L4 at a position above the closed-end of the slide fastener. On the other hand, the rectangular portion 50 is not sewn to the cloth tape 2a.

In the third embodiment, as shown in FIG. 8, after the slider 3 reaches to a bottom end side of the cloth tapes 2a, 2b, the closed-end of the slide fastener is stored inside the bag-shaped storing portion 5c. Thus, the closed-end of the slide fastener can be entirely stored so as not to be exposed.

Any of the storing portions 5a to 5c may be positioned below the seat back as the seat skin is finally sealed. To keep the functionality of the open slide fastener, end portions of the cloth tapes 2a, 2b which are stored in the storing portion 5a to 5c may be left unstitched.

In the above-described embodiments, while the slide fastener attached to each of the boundary portions between the back piece and the side pieces of the seat skin is exemplified, the invention is not limited thereto. The invention can be applied widely to slide fasteners to be attached to seat skins. For example, the invention can be applied to a side pocket which is provided on a rear portion of a seat back so as to be opened or closed by a slide fastener for storing a thin flat article such as magazines or maps.

The invention claimed is:

1. A closed-end treatment structure for a slide fastener of a vehicle seat, the structure comprising:
    a pair of cloth tapes attached to a seat skin of the vehicle seat;
    a pair of teeth lines respectively attached to the pair of cloth tapes;
        a slider which moves from a top stop side to a bottom stop side of the teeth lines while detachably meshing the teeth lines;
    a pull-tab connected to the slider through a connection portion; and
    a storing portion attached in the vicinity of the bottom stop side of the teeth lines, and formed into a tube-like shape so as to enclose the slider, the pull-tab and end portions of the cloth tapes, in a state where the slider is moved to the bottom stop side of the teeth lines.

2. The structure of claim 1, wherein the storing portion has a depth of about Y, where a substantially total length of the slider and the pull-tab is Y in a state where the pull-tab is turned over toward the meshed teeth lines.

3. The structure of claim 2, wherein the storing portion comprises a rectangular cloth material having a lateral width of about 2X, the slide fastener having a lateral width X,
    wherein the cloth material is folded to sandwich one of the cloth tapes and sewn thereto, thereby forming the storing portion which encloses the one of the cloth tapes, and
    wherein the storing portion stores the other of the cloth tapes through an opening.

4. The structure of claim 2, wherein the storing portion is formed from a rectangular cloth material having a lateral width of about 2X, where a lateral width of the closed-end of the slide fastener is X,
    wherein the cloth material is folded to sandwich one of the cloth tapes and sewn thereto, thereby forming the storing portion which orients outward the one of the cloth tapes, and
    wherein the storing portion stores the other of the cloth tapes by being turned inside out.

5. The structure of claim 2, wherein the storing portion is formed from a cloth material having a rectangular portion and a sewing belt portion which continues from substantially a center of an upper edge of the rectangular portion,
    wherein the rectangular portion has a lateral width of about 2X, where a lateral width of the closed-end of the slide fastener is X,
    wherein side edges the cloth material which is being folded are sewn together except an upper edge and a folded edge to have a bag shape,
    wherein the sewing belt portion is sewn to one of the cloth tapes above the closed-end of the slide fastener, and
    wherein the storing portion stores both of the cloth tapes inside the bag shape.

* * * * *